US012623596B2

(12) United States Patent
O'Brien

(10) Patent No.: US 12,623,596 B2
(45) Date of Patent: May 12, 2026

(54) PERSONAL VEHICLE SAFETY BEACON

(71) Applicant: John Patrick O'Brien, Woodland Hills, CA (US)

(72) Inventor: John Patrick O'Brien, Woodland Hills, CA (US)

( * ) Notice: Subject to any disclaimer, the term of this patent is extended or adjusted under 35 U.S.C. 154(b) by 0 days.

(21) Appl. No.: 18/213,192

(22) Filed: Jun. 22, 2023

(65) Prior Publication Data

US 2023/0415644 A1    Dec. 28, 2023

Related U.S. Application Data

(60) Provisional application No. 63/355,474, filed on Jun. 24, 2022.

(51) Int. Cl.
*B60Q 7/00*    (2006.01)
*B60G 7/00*    (2006.01)
*B60Q 1/52*    (2006.01)

(52) U.S. Cl.
CPC ................. *B60G 7/00* (2013.01); *B60Q 1/52* (2013.01)

(58) Field of Classification Search
CPC .................................... B60Q 1/52; B60Q 7/00
See application file for complete search history.

(56) References Cited

U.S. PATENT DOCUMENTS

| | | | | |
|---|---|---|---|---|
| 4,347,905 A | * | 9/1982 | Berckes ................. | G01G 21/14 |
| | | | | 177/149 |
| 4,833,443 A | * | 5/1989 | Siew ....................... | B60Q 1/503 |
| | | | | 362/486 |
| 5,249,381 A | * | 10/1993 | Panossian ............. | G09F 21/048 |
| | | | | 116/28 R |
| 6,276,080 B1 | * | 8/2001 | Brennan ................ | B60Q 7/005 |
| | | | | 116/63 T |
| 6,814,022 B1 | * | 11/2004 | West ....................... | B60Q 1/268 |
| | | | | 116/28 R |
| 9,928,764 B2 | * | 3/2018 | Heath ...................... | G09F 17/00 |
| 11,110,748 B1 | * | 9/2021 | Scott ........................ | G09F 21/04 |
| 2002/0113186 A1 | * | 8/2002 | Sher ........................ | A45C 13/03 |
| | | | | 248/309.1 |
| 2005/0057941 A1 | * | 3/2005 | Pederson ................ | F21S 10/06 |
| | | | | 362/542 |
| 2008/0098634 A1 | * | 5/2008 | Stadjuhar .................. | G09F 7/00 |
| | | | | 40/605 |
| 2016/0027266 A1 | * | 1/2016 | Mc Donagh ........... | G08B 7/062 |
| | | | | 340/815.4 |
| 2017/0232886 A1 | * | 8/2017 | Dellock ................ | B60R 1/1207 |
| | | | | 362/510 |
| 2022/0136663 A1 | * | 5/2022 | Qiu ........................... | F21L 4/02 |
| | | | | 362/33 |

* cited by examiner

*Primary Examiner* — Omer S Khan
(74) *Attorney, Agent, or Firm* — KELLY & KELLEY, PLLC

(57) ABSTRACT
The present invention resides in a personal vehicle safety beacon. The safety beacon can be selectively attached to and extend from a window of a vehicle and be illuminated to alert nearby drivers of the hazard of the stopped vehicle or the need for assistance.

21 Claims, 8 Drawing Sheets

PERSONAL VEHICLE SAFETY BEACON

RELATED APPLICATIONS

This application claims the benefit of U.S. Provisional Application No. 63/355,474, filed on Jun. 24, 2022.

FIELD OF THE INVENTION

The present invention generally relates to vehicle hazard warning lights. More particularly, the present invention relates to a personal vehicle safety beacon selectively extendable from a window of the vehicle to warn others that the vehicle is faulty or in other emergency situations.

BACKGROUND OF THE INVENTION

Passenger cars and light trucks account for the majority of cars in the United States. All such passenger cars and truck vehicles are required to have rear brake lights which illuminate when the vehicle is slowing down or stopping. Moreover, since 1986 for passenger cars, and since 1994 for light trucks, the National Highway Permit Rules of the United States Highway Traffic Safety Agency (NHTSA), and corresponding regulations of several states, have required such vehicles to have a CHMSL rear stop lamp mounted as standard equipment at a central high place. The purpose of CHMSL rear stop lamps is to prevent a car or light truck from being crashed into by another vehicle by notifying that the preceding vehicle is braking or stopping. Such requirements were derived from a test conducted in 1983 by the NHTSA, showing that CHMSL rear stop lamps for taxis and corporate vehicles reduced rear-end collisions by approximately 35%. However, the NHTSA in 1989 found that those successful results using CHMSL rear stop lamps would only prevent rear-end collisions by approximately 4.3% for passenger cars and approximately 5.0% for light trucks. It was determined that drivers get used to CHMSL rear stop lamps over time, and thus the effectiveness of such a device seems to gradually decline.

Serious danger can arise when a vehicle is severely damaged so that it can no longer be driven on or near congested roads or highways. To warn of this danger, all vehicles in the United States are required to have a four-way flasher system. With this system, the driver depresses the hazard light button, which automatically starts blinking two of the front direction lamps and the two rear direction lamps simultaneously. In some instances, drivers are allowed to use such flashing lights to alert other drivers who are approaching an emergency while approaching, overtaking, or passing through an accident or obstacle.

Despite the emergence and long-term use of four-way flashing direction indicators and CHMSL rear stop lamps, rear-end collisions, particularly collisions with stopped or faulty vehicles, remain a serious problem in the United States. Accordingly, there is a continuing need for a vehicle hazard warning light for passenger cars and light trucks which provides added visible cautionary action in order to avoid the risk of rear-end and other collisions of such stopped cars. The present invention addresses these needs, and provides other related advantages.

SUMMARY OF THE INVENTION

The present invention resides in a personal vehicle safety beacon. The personal safety beacon can be used by a vehicle owner as an additional hazard warning light which provides added visible cautionary action in order for others to clearly see the vehicle and avoid the risk of colliding with the vehicle or become aware of an emergency situation.

The personal vehicle safety beacon of the present invention generally comprises a beacon support arm that is manually detachably connectible to an upper edge of a vertically movable window of a vehicle. A warning signal housing is attached to the beacon support arm. A warning signal, comprising at least one electrically illuminated light, is incorporated into the warning signal housing.

The beacon support arm may include a notch for receiving an upper edge of the window therein. The beacon support arm may include a plurality of notches of differing diameters to receive windows of different thicknesses. The beacon support arm may include a fingerhold for holding the personal vehicle safety beacon for placement on the window.

The beacon support arm may be pivotally attached to the warning signal housing, and movable from a retracted position at least partially within or adjacent to the warning signal housing to an extended position away from the warning signal housing. A switch may automatically activate the electrically illuminated light when the beacon support arm is in the extended position.

A source of power may be associated with the warning signal housing. The source of power may comprise a rechargeable battery disposed within the warning signal housing.

The electrically illuminated light may comprise an array of LEDs. The array of LEDs may comprise color LEDs or the array may be disposed behind a color translucent lens or portion of the housing. The array of LEDs may be arranged to form an arrow-like signal pointing away from the vehicle. An electronic controller may be used to illuminate the LED array in a predetermined sequence. The warning signal housing may have a plurality of air flow passages formed therethrough.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

As shown in the accompanying drawings, for purposes of illustration, the present invention is directed to a personal vehicle hazard warning and safety beacon, generally referred to by the reference number 100. The beacon 100 of the present invention is used in situations when a vehicle is inoperable and either in the road or on the side of the road, or when there exists hazardous or emergency situations either to the driver or occupants of the vehicles or surrounding areas. The beacon 100 of the present invention significantly enhances any existing vehicle hazard warning lamps for passenger cars and light trucks, and provides an alternative to approaching a vehicle that has stopped, broken down or decelerated or otherwise has an emergency situation. The beacon 100 of the present invention can be used to avoid the risk of rear-end collisions with an inoperable vehicle, or alert others to the need for assistance.

Figure 1:
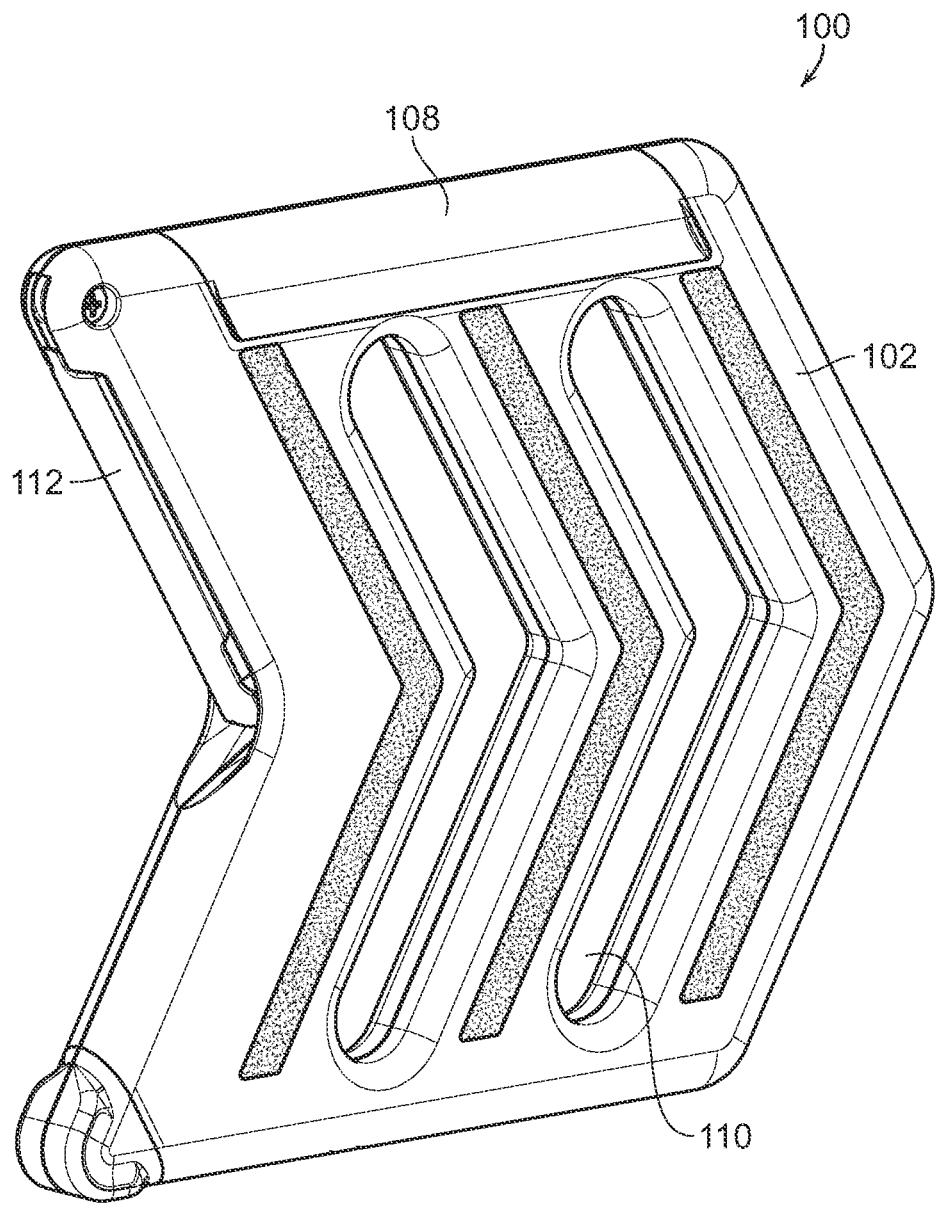
FIG. 1 is a side elevational view of a personal vehicle safety beacon embodying the present invention.
Figure 2:
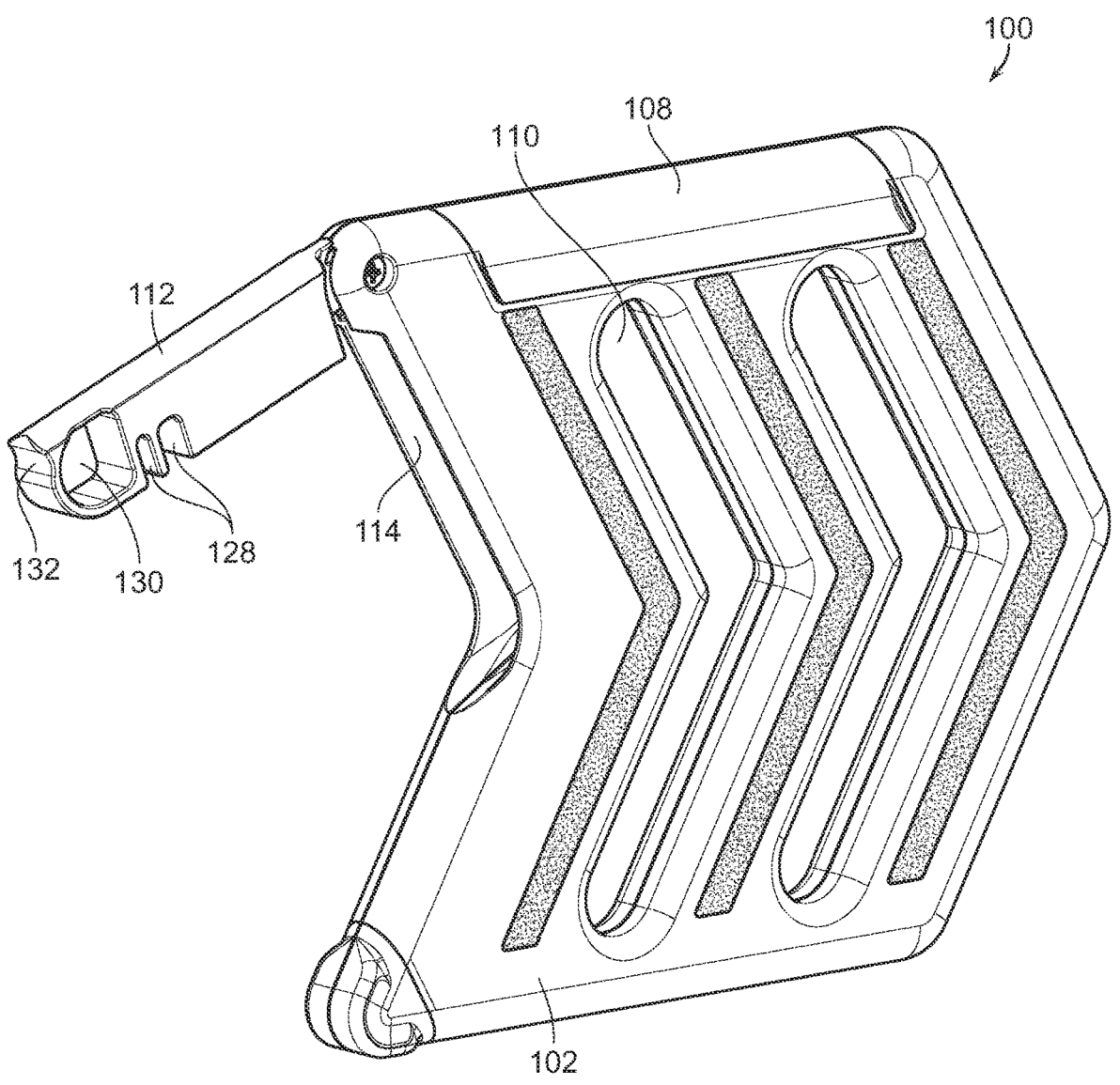
FIG. 2 is a side perspective view similar to FIG. 1, with a beacon support arm extending from the beacon housing.
Figure 3:
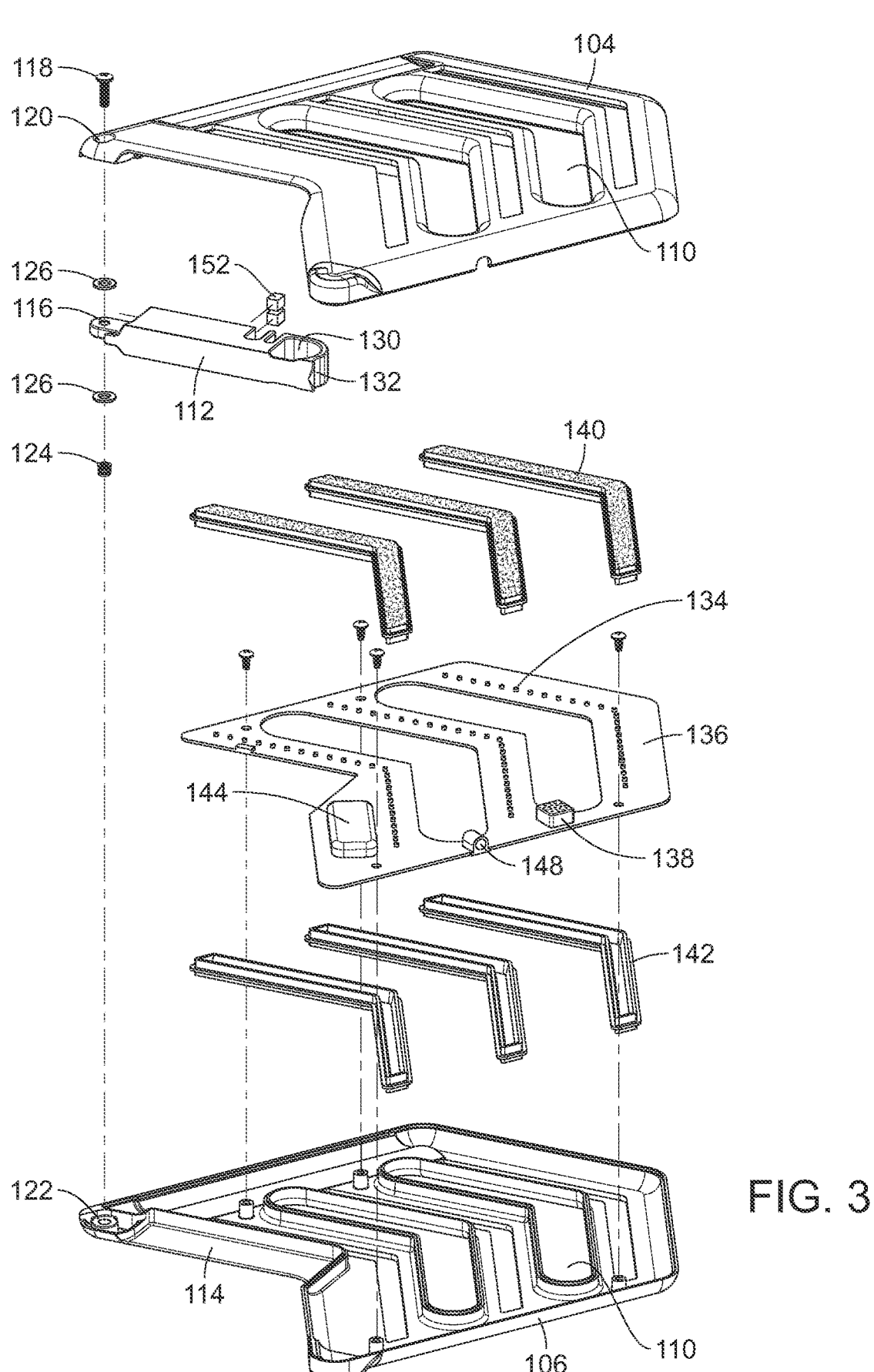
FIG. 3 is an exploded perspective view of the personal vehicle safety beacon.

With reference now to FIGS. 1-3, the personal vehicle safety beacon 100 is sized so as to be easily stored in a user's vehicle, such as underneath the user's seat, in a map pocket, a side door compartment or the like. This allows for easy and convenient access when needed, such as when the user's vehicle becomes inoperable or emergency situations are present. As will be more fully described herein, the personal vehicle safety beacon 100 can be placed so as to extend outside of the vehicle, such as attached to and extend from a window of the vehicle, and be illuminated to alert nearby drivers of the hazard of the stopped vehicle or the need for assistance.

With continuing reference to FIGS. 1-3, the personal vehicle safety beacon 100 comprises a warning signal housing 102 having a warning signal comprising at least one electrically illuminated light incorporated into the housing 102. As shown in FIG. 3, the housing 102 may comprise a first housing member 104 and a second housing member 106. As illustrated, the first and second housing members 104 and 106 may be mirror images of one another so as to be aligned and mate with one another and provide one or more internal chambers or spaces for internal components, including the at least one electrically illuminated light and/or the electronic components for illuminating such warning signal light. The first and second housing members 104 and 106 may be comprised of a plastic material, and may be molded or otherwise formed as necessary.

One or more exterior surfaces of the housing 100 may be texturized, such as by adding a textured material thereto, forming a rough or irregular surface during the manufacturing process, etc. One or more grips 108 may be formed on the housing 102 to facilitate firm grasping and gripping by the user of the beacon 100 during use. Such one or more grips 108 may be comprised of rubber or other greppable material which may be molded or otherwise attached onto the housing 102.

The housing 102 may have one or more air flow passages 110 formed therethrough. For example, as illustrated in FIG. 3, each of the housing members 104 and 106 may have air flow apertures 110 formed therein, which are generally aligned with one another when the housing 102 is formed by bringing the housing members 104 and 106 together and attachment to one another. Such apertures 110 may facilitate the grasping or gripping of the beacon 100 by the user. Such air passages 110 formed through the housing 102 may also serve to provide air flow and aerodynamics through the housing 102 in windy weather so as to help stabilize the beacon 100 and reduce excessive wind force thereon. Incorporation of the air flow passageways 110 also reduces the overall weight of the beacon 100.

A beacon support arm 112 is associated with the housing 102, so as to extend therefrom. In the illustrated embodiment, as illustrated in FIGS. 1 and 2, the beacon support arm 112 is pivotally attached to the warning signal housing 102 and is movable from a retracted position, at least partially within or adjacent to the warning signal housing, as illustrated, in FIG. 1, to an extended position away from the warning signal housing 102, as illustrated in FIG. 2. The housing 102 may include a recessed area 114 which at least partially receives the beacon support arm 112. The beacon support arm 112 may have an aperture 116 through which a bolt 118 or pin or the like may extend through, as well as through blind apertures 120 and 122 of the housing members 104 and 106. A nut 124 may be attached to an end of the bolt 118 so as to secure it in place. Washers or O-rings 126 may be disposed on either side of aperture 116 to facilitate the interconnection of bults 118 and nut 124 and facilitate pivoting of the window support arm 112 between open and closed positions.

The beacon support arm 112 is manually detachably connectable to an upper edge of a vertically movable window of a vehicle. This may be accomplished by the beacon support arm 112 having a notch 128 therein for receiving an upper edge of the window therein. As illustrated, the beacon support arm 112 may have a plurality of notches 128 of differing diameters to receive windows of different thicknesses. The one or more notches 128 are formed on a lower surface of the support arm 112, so as to hang the beacon 100 from the vehicle's car window so that it extends outwardly from the vehicle.

With reference now to FIG. 2, the support arm 112 forms a grip for grasping by the user. The elongated support arm 112 may be grasped by the user when using the device. In a particularly preferred embodiment, as illustrated, the support arm 112 includes a fingerhold 130, such as in the form of an aperture configured to receive one or more fingers of the user therein towards an end of the support arm 112. An end of the support arm 112 may be configured as a thumb rest 132 configured for the user to place his or her thumb thereon. With the user's thumb on the thumb rest 132 and one or more fingers in the fingerhold 130 the user may hold the support arm 112 in a pistol grip so as to hold in place the beacon 100 on the window.

With reference now to FIG. 3, an exploded perspective view of the component parts of the beacon 100 is shown. As mentioned above, the first and second housing shell members 104 and 106 create one or more cavities or spaces into which are disposed at least one electrically illuminated light and related electronic components. In a particularly preferred embodiment, the electrically illuminated light comprises at least one array of LEDs 134. It will be appreciated, however, that instead of LEDs, phosphorus strip lights or other sources of light could be used instead. The LEDs 134 are attached to and extend from a printed circuit board (PCB) 136 which is disposed within the housing 102. Preferably, the LEDs 134 extend from both sides of the PCB 136, or from opposed surfaces of PCBs 136 placed back-to-back so as to illuminate both the front and back surfaces of the beacon 100. An electronic circuit, which may include a controller 138, is used to selectively illuminate the LEDs 134. The electronic controller 138 may illuminate the LEDs 134 in a predetermined sequence.

The LEDs 134, which may be formed in one or more arrays, may be illuminated in a sequence forming an arrow-like signal pointing away from the vehicle. Moreover, the housing 102 may be formed in such an arrow-like configuration. As illustrated, the housing members 104 and 106, the apertures 110, which are spaced apart from one another, and even the printed circuit board 136 are formed in an arrow-like or chevron pattern, which facilitates the arrangement of the LEDs to form an arrow-like signal pointing away from the vehicle.

The LEDs 134 may comprise color LEDs, such as red or orange, so as to be readily seen and warn oncoming traffic. Alternatively, lenses 140 and 142 may be disposed over the LEDs 134. The lenses 140 and 142 may be of a predetermined color, such as red or orange, and translucent such that when the LEDs 134 illuminated the light which passes through the lenses 140 and 142 is seen as the desired color, such as red or orange or the like. The lenses 140 and 142 may also be configured so as to disperse the light, as desired. The lenses 140 and 142 may also be of a chevron or other arrow-like configuration and be disposed over the LED arrays 134. The lenses 140 and 142 may extend through the housing members 104 and 106. The lenses 140 and 142 may be sonically welded, or otherwise attached, to the inside of the housing 102 or attached with fasteners or the like either directly to the PCB board 136 or attached to the housing members 104 and 106. Alternatively, housing members 104 and 106 may include portions which are transparent, translucent and/or of a desired color.

In the illustrated embodiment, there are three LED arrays 134 and three corresponding sets of lenses 140 and 142 which are spaced apart from one another, collectively forming a chevron pattern. It will be understood, however, that this arrangement and design can be varied as desired. The electronic circuitry, including controller 138, may illuminate the LEDs 134 such that there are three flashing chevrons from the beacon 100 that may be adjustable in both speed and flashing pattern. Such can be easily seen on both sides of the beacon 100 as it extends from the vehicle.

Figure 4:
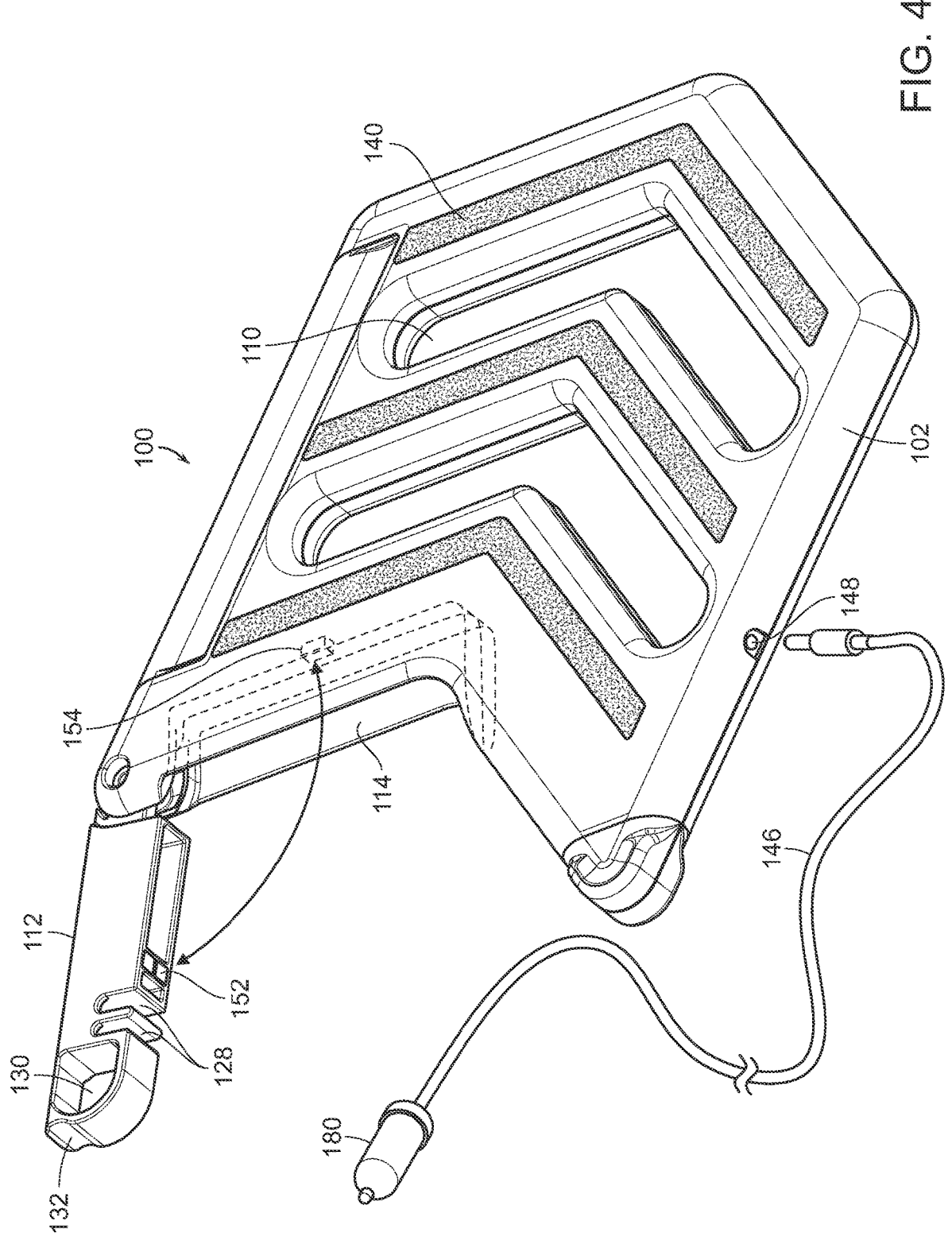
FIG. 4 is a side perspective view of the personal vehicle safety beacon, illustrating a power cord extending therefrom and activation of a switch as the beacon support arm is extended, in accordance with the present invention.

With reference to FIGS. 3 and 4, a source of power is associated with the warning signal housing 102. This may comprise a battery 144. The battery may be rechargeable, such as by means of the charging cord 146 which may be inserted into port 148 and at the opposite end have a plug, USB connector, or car charger adapter 150. Alternatively, the charging cord 146 could be plugged into the vehicle outlet and used to provide power to the beacon 100.

Figure 5:
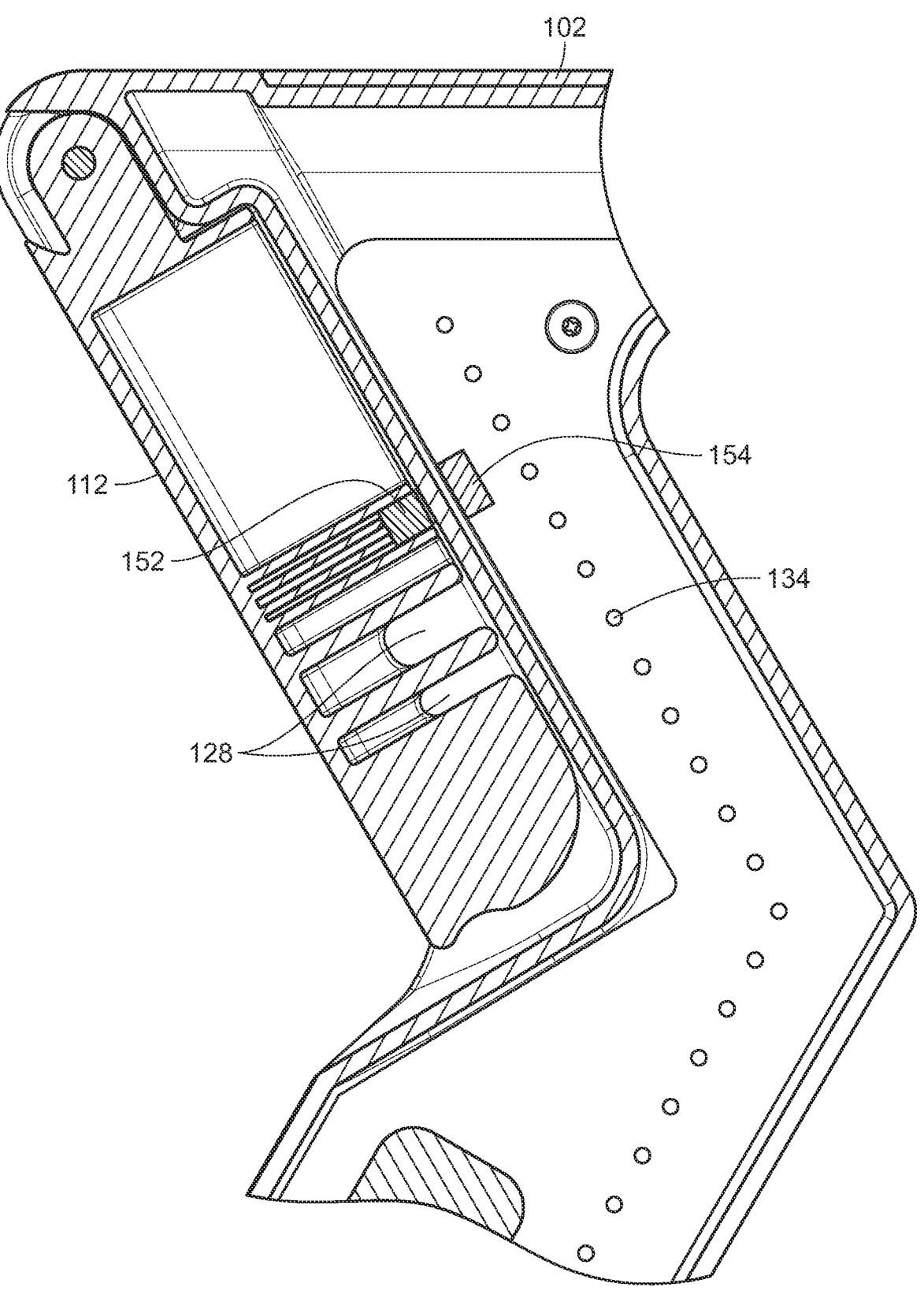
FIG. 5 is a cross-sectional view of the switch, beacon support arm and adjacent housing of the personal vehicle safety beacon.

With reference now to FIGS. 3-5, the beacon 100 may include a switch for activating the electrically illuminated light. Such a switch may automatically activate the electrically illuminated light when the beacon support arm 112 is moved into the extended position. For example, when the beacon support arm 112 is in the folded and retracted position, as illustrated in FIG. 1, the switch is turned off. However, when the beacon support arm 112 is extended, as illustrated in FIGS. 2 and 4, the switch is activated. The activated switch then powers the electronics 138 and the LEDs 134 or other light.

An exemplary switch is shown comprising a magnet proximity switch. One or more magnets 152 may be installed in the support arm 112, which when in the retracted position is sufficiently adjacent to a magnetic proximity switch 154, which is in electronic communication with the controller or other electronics or source of power, to act as the automatic switch to power on or off the beacon 100.

When in the retracted position the magnets 152 are adjacent to the magnet switch 154 and the device is powered off. However, when the support arm 112 is extended away from the housing 102, as illustrated in FIG. 4, the proximity switch 154 senses the removal of the magnetic fields of the one or more magnets 152, causing the LEDs 134 to be powered and illuminated. Other means of activating the beacon 100 and illuminating the LEDs 134 or other light may be provided, such as a manual slide or push switch, attachment of the device to an exterior power source or the like.

Figure 6:
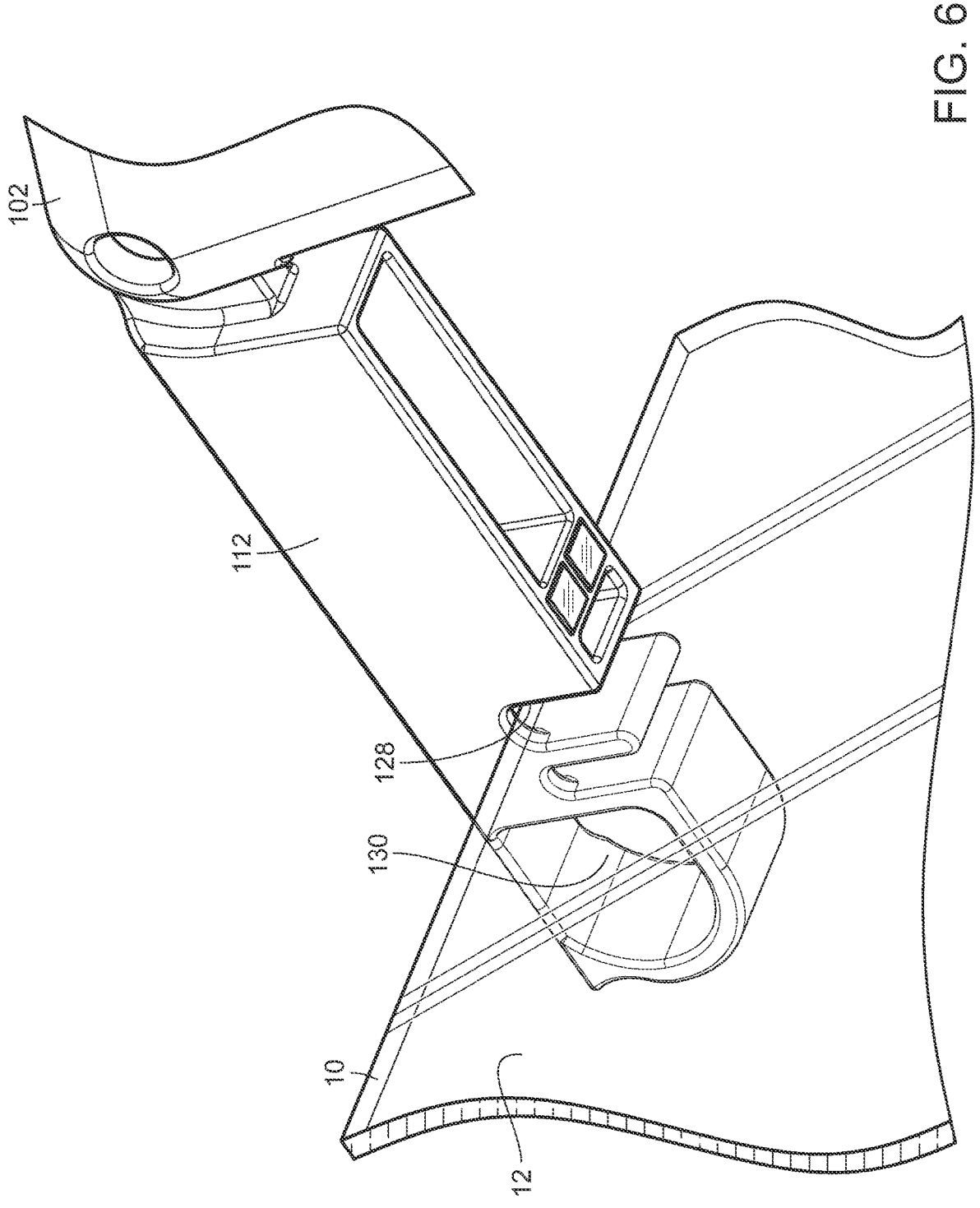
FIG. 6 is a partially fragmented perspective view illustrating the beacon support arm being connected to an upper edge of a window of a vehicle, in accordance with the present invention.
Figure 7:
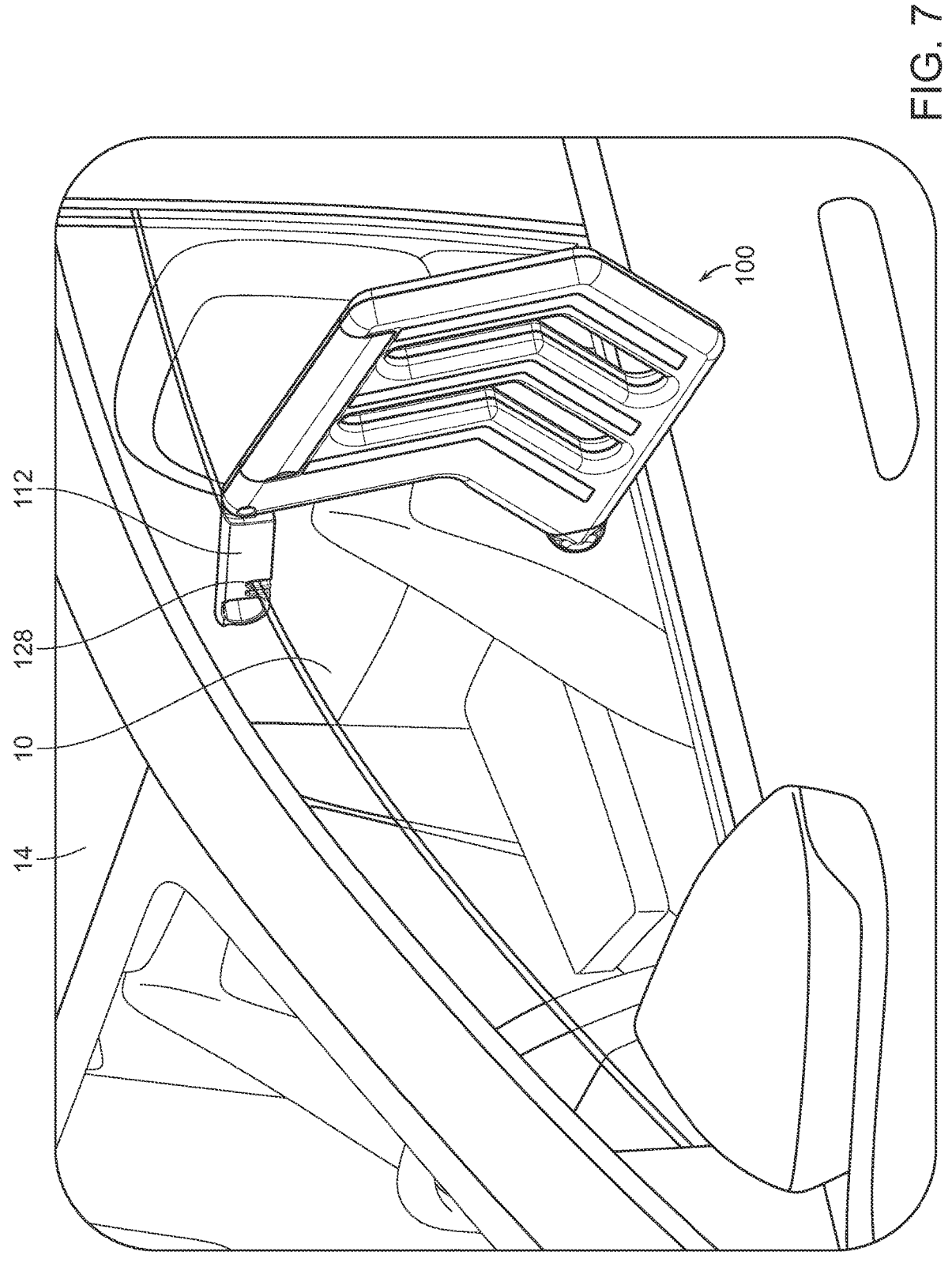
FIG. 7 is a perspective environmental view, illustrating the personal vehicle safety beacon hanging from the vehicle window and extending from the car, in accordance with the present invention.
Figure 8:
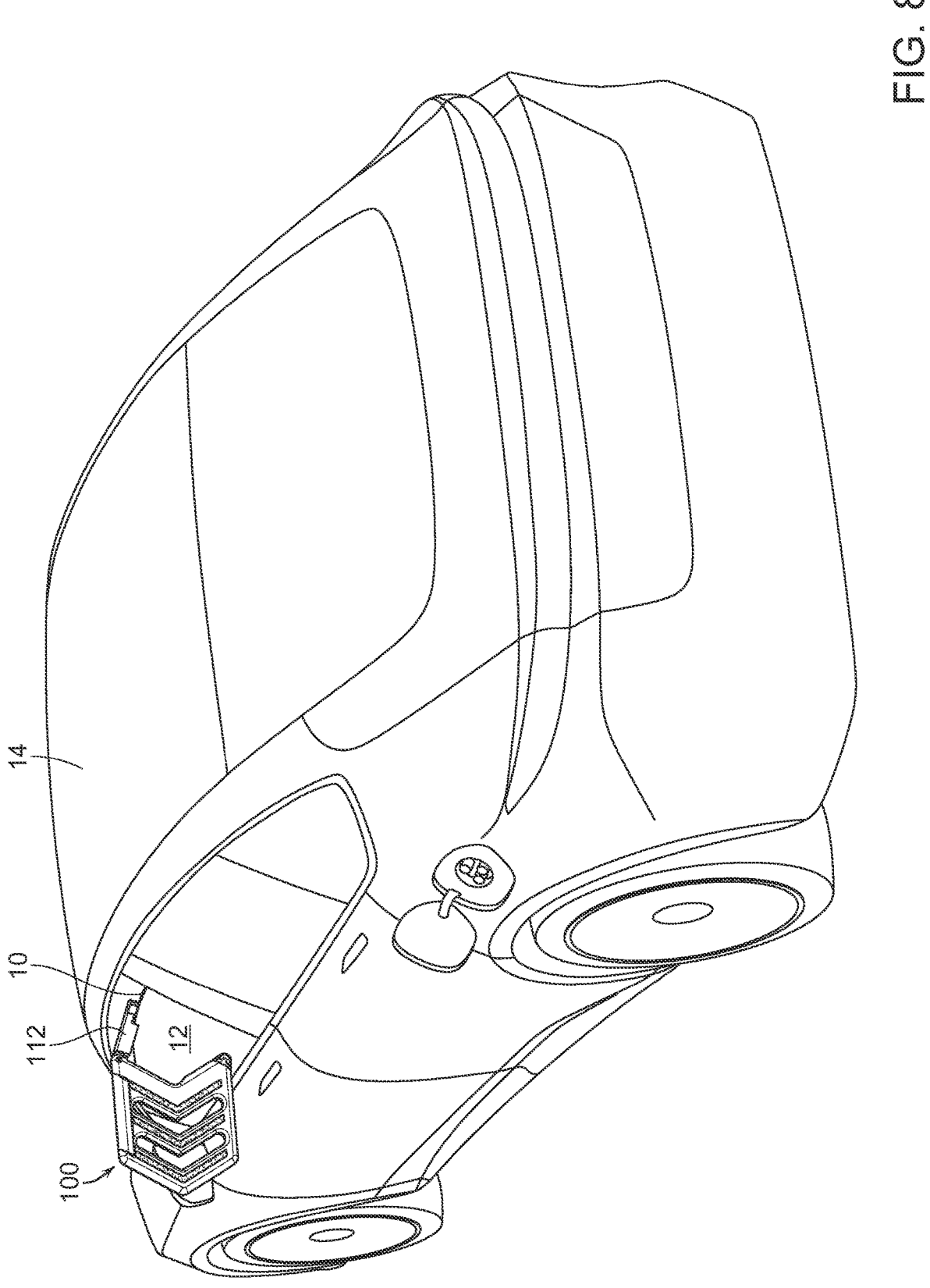
FIG. 8 is an environmental perspective view illustrating the personal vehicle safety beacon of the present invention extending from a vehicle window, in accordance with the present invention.

With reference now to FIGS. 6-8, in use, the beacon support arm 112 is used to attach the beacon 100 to an upper edge 10 of a window 12 of a vehicle 14. This may be, for example, the window adjacent to the driver of the vehicle, although it could be any window of the vehicle. The window is lowered such that the upper edge 10 thereof is accessible and the beacon 100 can be positioned outside of the vehicle and the window 12. The user may utilize the fingerhold 130, as described above, in positioning the upper edge 10 of the window within one of the notches 128 of the support arm 112, as illustrated in FIG. 6. As mentioned above, manually extending the support arm 112 from the housing 102 may automatically cause the one or more electrically illuminated lights, such as the array of LEDs 134, to illuminate.

The beacon 100, after being attached to the window 12 hangs from the upper edge 10 of the window so as to extend from the car, as illustrated in FIGS. 7 and 8. The window may then be closed so as to securely hold the beacon 100 in place, extending away from the vehicle. The beacon 100 will be visible from both the front and rear of the vehicle 14 by oncoming traffic, and the illumination of the one or more lights therein, preferably in a sequential pattern, will alert such oncoming traffic, either during the day or night, of the hazard of the stopped vehicle or the need of the vehicle's occupants for assistance. It will be appreciated that the beacon 100 immediately draws attention to drivers and those around the vehicle both during daylight and nighttime or darker conditions. The user can install the beacon 100 of the present invention quickly and easily while never leaving the safety of their car, and even remaining within their car and with the seatbelt buckled, increasing safety for the driver and other occupants of the vehicle. The housing 102 may be waterproof or water resistant so as to prevent ingress of water into the housing, such as during inclement weather.

Although several embodiments have been described in detail for purposes of illustration, various modifications may be made without departing from the scope and spirit of the invention. Accordingly, the invention is not to be limited, except as by the appended claims.

What is claimed is:

1. A personal vehicle safety beacon, comprising:
   a beacon support arm manually detachably connectable to an upper edge of a vertically movable window of a vehicle, wherein the beacon support arm includes a plurality of notches; and
   a warning signal housing pivotally attached to the beacon support arm, wherein the housing includes one or more air flow passages formed therethrough, wherein the warning signal housing includes a plurality of flashing chevrons disposed parallel to one another; and
   wherein the personal vehicle safety beacon is connected to the window of the vehicle, the warning signal housing extends outwardly from the window so that the flashing chevrons are disposed generally perpendicular to the window to face the direction of oncoming traffic.

2. The personal vehicle safety beacon of claim 1, wherein the beacon support arm includes a notch for receiving the upper edge of the window therein.

3. The personal vehicle safety beacon of claim 1, wherein the beacon support arm is movable from a retracted position at least partially within or adjacent to the warning signal housing to an extended position away from the warning signal housing.

4. The personal vehicle safety beacon of claim 1, including a switch which automatically activates the flashing chevrons when the beacon support arm is in the extended position.

5. The personal vehicle safety beacon of claim 1, wherein the flashing chevrons comprises an array of LEDs.

6. The personal vehicle safety beacon of claim 5, wherein the array of LEDs comprises color LEDs or the array is disposed behind a color translucent lens or portion of the housing.

7. The personal vehicle safety beacon of claim 1, wherein the flashing chevrons are arranged to form an arrow-like signal pointing away from the vehicle.

8. The personal vehicle safety beacon of claim 5, including an electronic controller for illuminating the flashing chevrons in a predetermined sequence.

9. The personal vehicle safety beacon of claim 1, including a source of power associated with the warning signal housing.

10. The personal vehicle safety beacon of claim 9, wherein the source of power comprises a rechargeable battery disposed within the warning signal housing.

11. The personal vehicle safety beacon of claim 2, wherein the beacon support arm has a plurality of notches of differing diameters to receive windows of different thicknesses.

12. The personal vehicle safety beacon of claim 1, wherein the beacon support arm includes a fingerhold for holding the personal vehicle safety beacon for placement on the window.

13. The personal vehicle safety beacon of claim 1, wherein the warning signal housing has a plurality of air flow passages formed therethrough to decrease wind resistance of the warning signal housing.

14. A personal vehicle safety beacon, comprising:

a beacon support arm manually detachably connectable to an upper edge of a vertically movable window of a vehicle, wherein the beacon support arm includes a plurality of notches;

a warning signal housing attached to the beacon support arm, wherein the housing includes one or more air flow passages formed therethrough, wherein the warning signal housing includes a plurality of flashing chevrons disposed parallel to one another, and wherein the flashing chevrons comprise one or more arrays of electrically illuminated LEDs;

an electronic controller for illuminating the one or more LED arrays in a predetermined sequence; and a source of power associated with the warning signal housing for the one or more LED arrays;

wherein the beacon support arm includes a notch for receiving the upper edge of the window therein;

wherein the beacon support arm is pivotally attached to the warning signal housing and is movable from a retracted position at least partially within or adjacent to the warning signal housing to an extended position away from the warning signal housing; and wherein when the personal vehicle safety beacon is connected to the window of the vehicle, the warning signal housing extends outwardly from the window so that the flashing chevrons are disposed generally perpendicular to the window to face the direction of oncoming traffic.

15. The personal vehicle safety beacon of claim 14, including a switch which automatically activates the electrically illuminated LEDs when the beacon support arm is in the extended position.

16. The personal vehicle safety beacon of claim 14, wherein the array of LEDs comprises color LEDs or the array is disposed behind a color translucent lens or portion of the housing.

17. The personal vehicle safety beacon of claim 14, wherein the array of LEDs is arranged to form an arrow-like signal pointing away from the vehicle.

18. The personal vehicle safety beacon of claim 14, wherein the source of power comprises a rechargeable battery disposed within the warning signal housing.

19. The personal vehicle safety beacon of claim 14, wherein the beacon support arm has a plurality of notches of differing diameters to receive windows of different thicknesses.

20. The personal vehicle safety beacon of claim 14, wherein the beacon support arm includes a fingerhold for holding the personal vehicle safety beacon for placement on the window.

21. The personal vehicle safety beacon of claim 14, wherein the warning signal housing has a plurality of air flow passages formed therethrough to decrease wind resistance of the warning signal housing.

* * * * *